United States Patent Office 3,154,484
Patented Oct. 27, 1964

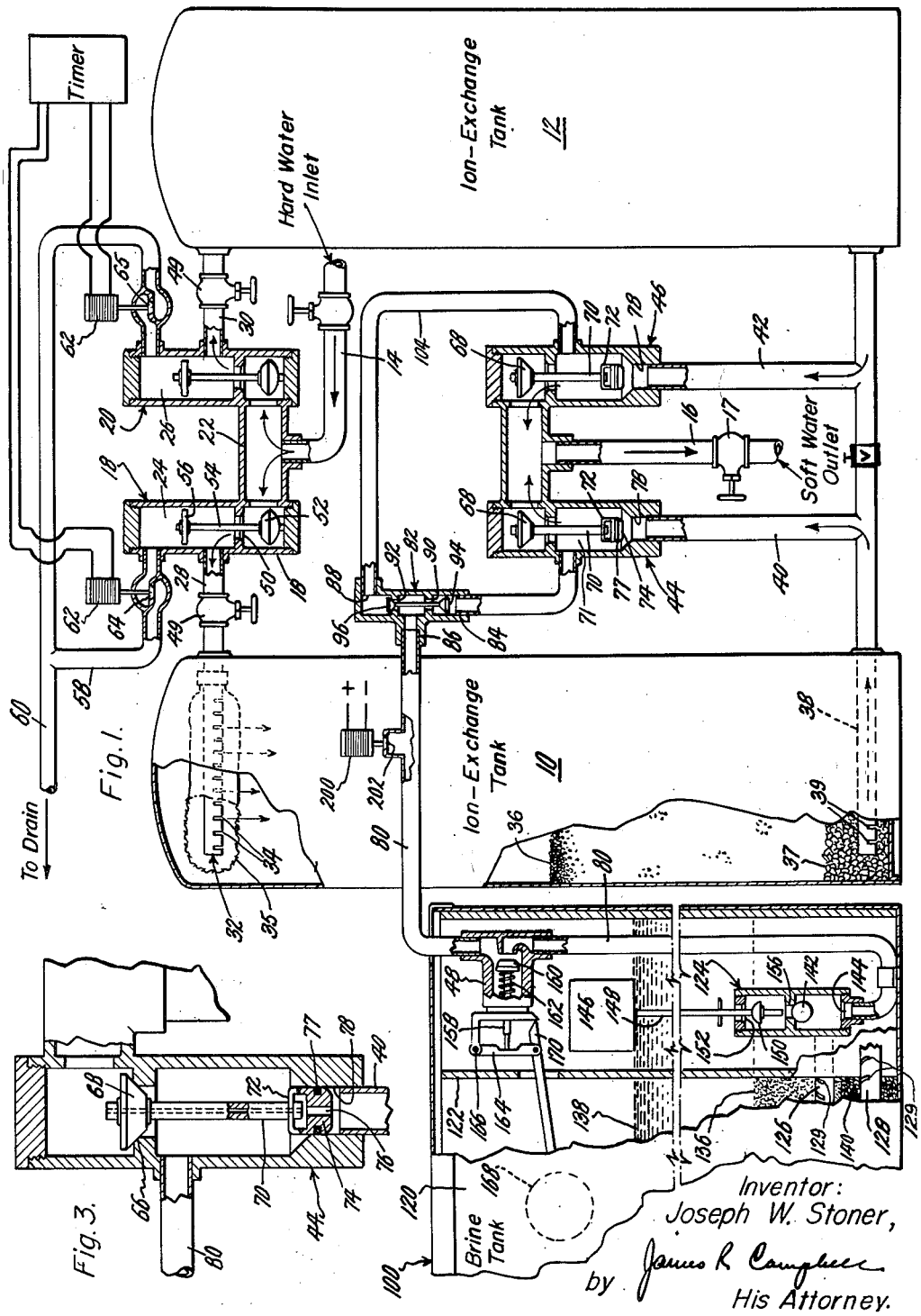

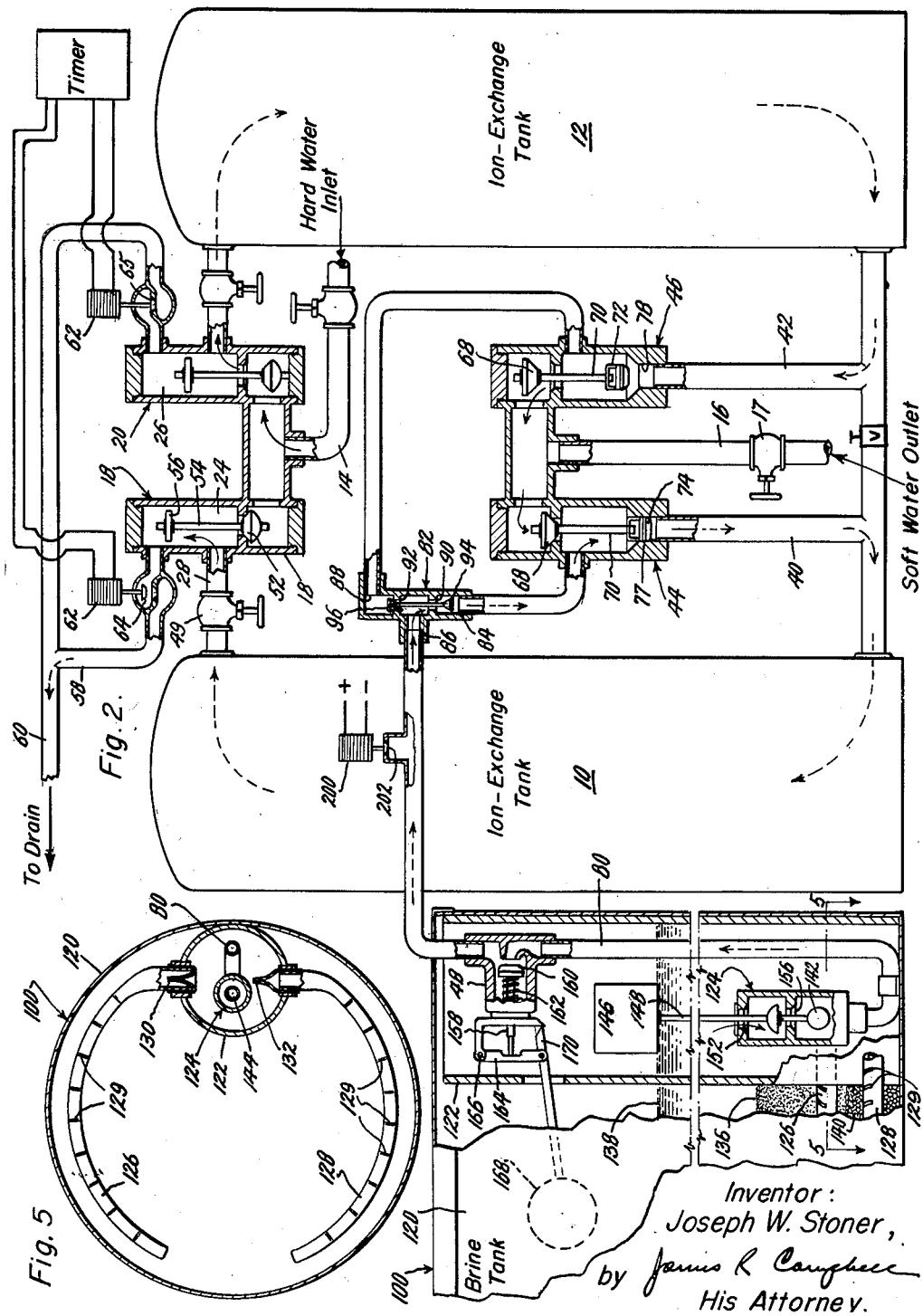

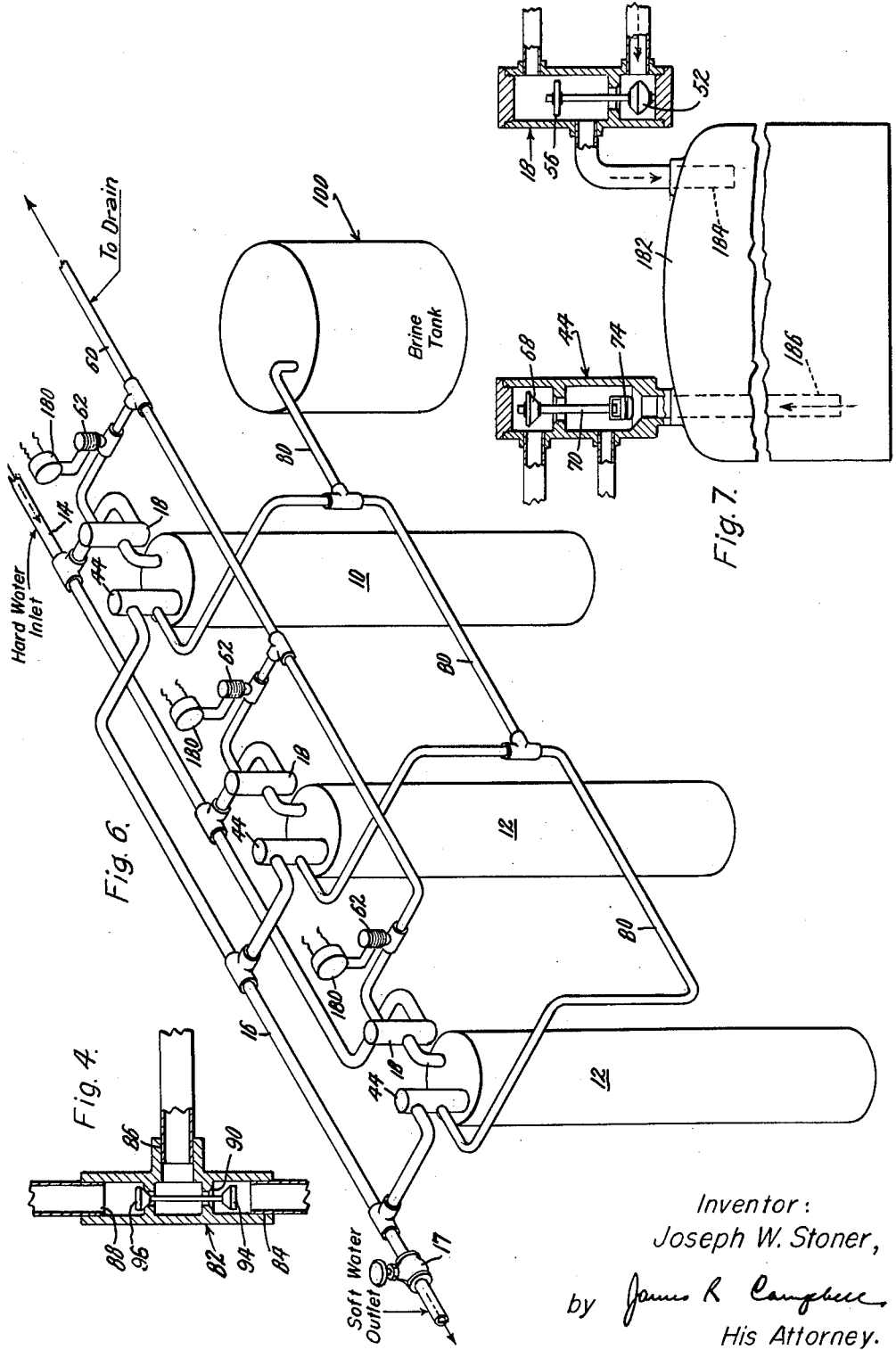

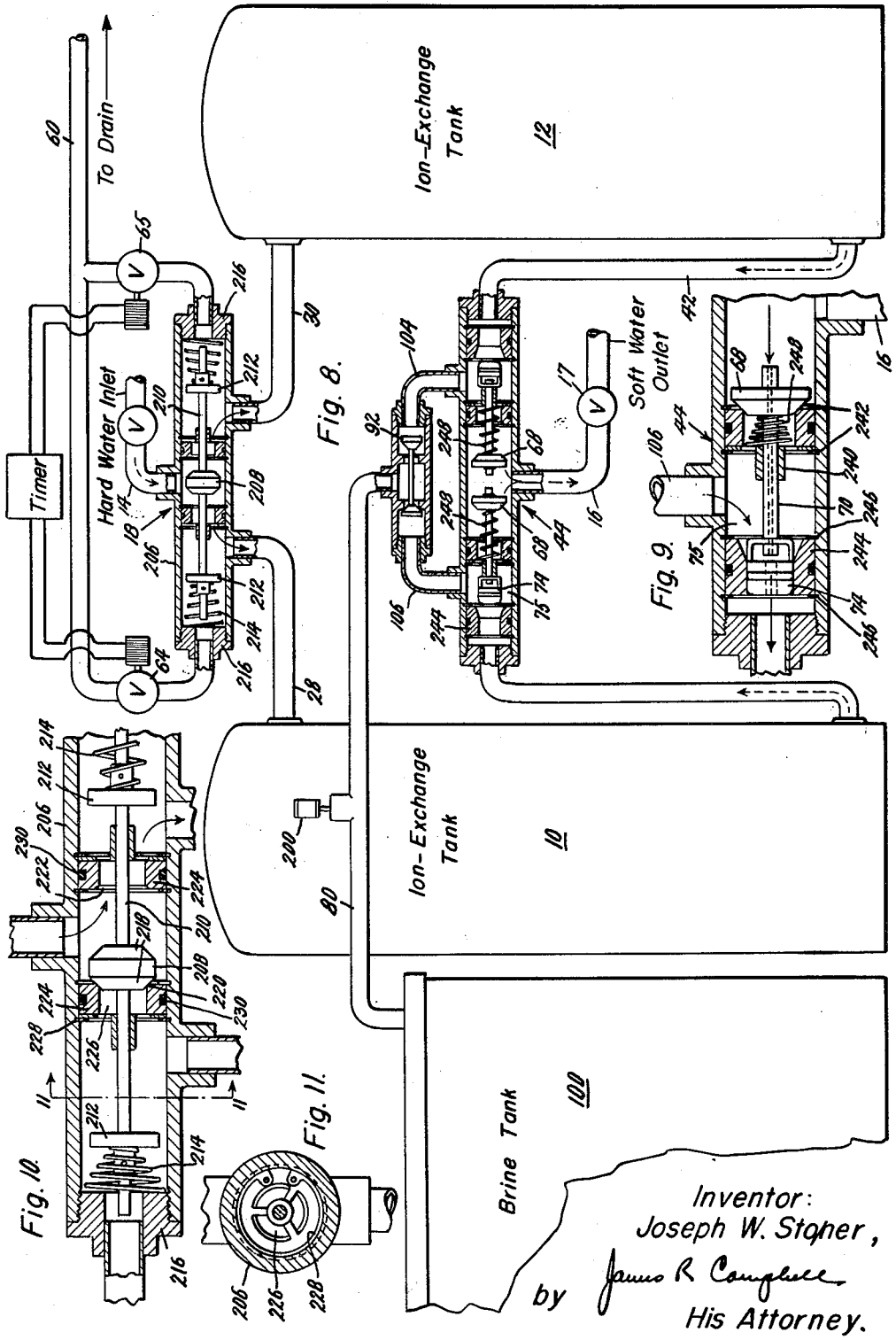

3,154,484
PROCESS AND APPARATUS FOR REGENERATING ION-EXCHANGE MATERIAL IN A WATER SOFTENING SYSTEM
Joseph W. Stoner, 1714 Eastern Parkway, Schenectady, N.Y.
Continuation of application Ser. No. 777,073, Nov. 28, 1958. This application June 5, 1962, Ser. No. 201,233
19 Claims. (Cl. 210—35)

This application is a continuation of my previous application Serial No. 777,073, filed November 28, 1958, now abandoned, and entitled "Process and Apparatus for Regenerating Ion-Exchange Material in a Water Softening System."

The invention described herein relates to water conditioners and more particularly to an improved apparatus and method for regenerating the ion-exchange material utilized in removing objectionable minerals from hard water used for commercial and domestic purposes.

The concept of softening water by passing it over or through ion-exchange materials, such as zeolite or synthetic resins, for principally removing calcium or magnesium ions and replacing them with an equivalent concentration of sodium ions, is old, and has resulted in the development of many different types of water softening apparatus for effecting exchange of ions on the resin particles. The problems involved in efficiently operating commercial and domestic water softening systems however, do not relate to how purified water can be supplied at the user end because soft water is obtainable merely by permitting the hard water to flow over the ion-exchange particles and collecting it at the discharge side of the softening apparatus. Rather, the problems relate to how the ion-exchange material can be regenerated economically under completely automatic conditions of operation. This invention discloses a process and apparatus for eliminating the prevailing problems associated with equipments now incapable of automatically providing efficient rejuvenation of the ion-exchange material.

The thrifty utilization of ion-exchange material demands that the impurities deposited thereon during the water softening process, be removed after it becomes contaminated to a predetermined degree. Various means are utilized for ascertaining the extent of contamination, but in most cases, the material is regenerated after a certain lapse of time, as indicated by a timer, or when a water meter shows that a definite amount of hard water has been passed through the softening apparatus. A brine solution is employed for effecting decontamination of the material and in depositing a plentiful supply of sodium ions on the ion-exchange material. In current practice, this is accomplished in some installations by a forward flushing process wherein the brine solution is circulated through the ion-exchange tank in a direction the same as the normal flow of hard water therethrough. In order to assure complete removal of brine from the system when regeneration of the material is achieved, a rinse with hard water follows until all brine traces are washed from the system.

The disadvantages involved in rinsing in a reverse direction, that is, in a direction opposite to the normal service flow, is that foreign deposits carried by the hard rinsing water become lodged in a gravel bed normally provided under the bed of ion-exchange material in the tank. In the usual installation, such foreign particles cannot successfully be removed by the rinse water with the result that the bed becomes clogged and presents an impediment to flow therethrough. Also, this undesirable action tends to exhaust the material in the bottom of the tank, so that when the tank is returned to service, the effluent water supposed to be treated, is only partially softened prior to delivery to the tap.

Other disadvantages inherent in prior art processes and apparatus is that during such a regenerating cycle, the soft water supply pipes become contaminated with hard water, thus permitting a mineral deposit to be formed on the interior walls of the pipes, particularly if the water is at elevated temperatures. Although this is not too serious an objection when considered in relation to a domestic water system, it becomes extremely important in commercial installations where soft water must always be available for use. In all instances where hard water is employed for brine rinsing purposes however, exhaustion of the ion-exchange material is accelerated because of the necessity of flushing hard water from the pipes. The time required to completely regenerate the material usually exceeds 45 minutes and in those installations designed to carry out the various regenerating steps manually, the attendance of an operator is necessary to shift a valve to the proper position corresponding to the correct step in the process, until regeneration is complete. Where electrical controls are used, the expense involved is considered to outweigh the benefits gained.

Other successful and well known systems eliminate the home maintenance aspects connected with water softening apparatus by merely replacing the used or contaminated tank with a fresh one previously regenerated in a factory. Because of the labor and other expenses involved, such a program is believed to represent an expensive method for obtaining soft water.

Although the above indicates generally the problems with respect to economical and automatic operation of presently known water softening apparatus, it nevertheless is apparent that the need is great for a device capable of supplying soft water on a continuous and uninterrupted basis to those activities requiring such service. The need is just as great that the system be economical in operation and subject to only minimum maintenance.

Accordingly, the primary object of my invention is to provide a system characterized by its ability to economically supply soft water to a point of use at all times and on an uninterrupted basis, while maintaining the ion-exchange material at relatively pure values.

Another object of my invention is the provision of water softening apparatus capable of automatically rejuvenating ion-exchange material therein while simultaneously satisfying the demands on the system for soft water.

A further object of the invention is to provide a water softening system wherein soft water is used during the regenerating and rinsing cycles.

Still another object of my invention is the provision of a process capable of carrying out the objects stated above.

In carrying out my invention, I provide a pair of ion-exchange tanks connected for parallel operation wherein double acting valves are located in the single hard water inlet and the single soft water outlet pipes connected to the tanks for independently or jointly supplying soft water to a point of use, such as a household tap. When regeneration of the ion-exchange material in the tanks is necessary, the position of the double acting valves connected with one of the tanks is reversed, thus permitting hard water to flow only into the top of the other tank. The hard water is softened during its passage through the ion-exchange material and the piping is arranged on the discharge side of this tank to cause the soft water to combine with a solution of brine prior to circulation in a reverse direction through the first tank for removing the impurities deposited on the ion-exchange material therein. During the process of regeneration, soft water in the other tank is available for domestic use. Upon completion of the step of circulating the brine solution, soft water is passed over the particles of ion-exchange material for a period of time sufficient to completely remove any traces of brine remaining in the tank; whereupon, the valves are caused to revert to their original position, to cause refilling of the brine tank and permit the system to return to normal operation. Rejuvenation of material in the other tank is carried out in the same manner as that for the first tank.

While the specification concludes with claims particularly pointing out and distinctly claiming the process and apparatus which I regard as my invention, it is believed the invention will be better understood from the following description taken in connection with the accompanying drawings in which:

FIGURE 1 is a view in elevation, partly in section, illustrating a water softening system having the valving arrangement therein set to provide soft water to a point of use;

FIGURE 2 is a view similar to FIGURE 1 showing the position of valves and flow of water and the brine solution during the regenerating cycle;

FIGURE 3 is a sectional view in elevation of a valve in its closed position employed for mixing brine with soft water prior to delivery to the ion-exchange tank;

FIGURE 4 is a sectional view in elevation of a double acting valve used in the system;

FIGURE 5 is a plan view taken on lines 5—5 of FIGURE 2 showing the brine tank used in the system;

FIGURE 6 shows an arrangement for providing soft water in a commercial installation;

FIGURE 7 is a detailed view in section of valves associated with the system of FIGURE 6; and FIGURE 8 illustrates a modification employing valves of slightly different construction;

FIGURE 9 is a sectional view showing a portion of a mixing valve used in the system of FIGURE 8;

FIGURE 10 is an enlarged view of another valve showing the disposition of parts when the system is in operation; and FIGURE 11 is a view taken on lines 11—11 of FIGURE 10.

Referring now to the drawings wherein like reference characters designate like or corresponding parts throughout the several views, there is shown in FIGURE 1 a water softening system utilized in supplying soft water to a domestic tap under conditions of complete automatic operation. The system comprises a pair of ion-exchange or softener tanks 10 and 12 positioned between a hard or raw water inlet pipe 14 and a soft water outlet 16 adapted for connection to a domestic tap, such as a faucet 17. In order to facilitate an understanding of the invention, the description is directed to a water supply system as installed in a house or other small building, although it will be obvious that it may have application in such varied uses as hotel or office building heating systems or for industrial or other processes requiring soft water for successful operation.

A pair of valve housings 18 and 20 are interconnected by a pipe 22 communicating with the hard water inlet 14, while chambers 24 and 26 therein receive pipes 28 and 30 extending from the softener tanks 10 and 12. The other ends of pipes 28 and 30 respectively are connected to distributors 32 having slots or apertures 34 which spray hard water into the tanks. Alternatively, the slotted distributors may be replaced with any other configuration of pipe capable of dispersing the water evenly over the bed of zeolite in tanks 10 and 12. A nylon bag 35 for example, may be used for obtaining a uniform dispersal of water into the top of the tanks.

The ion-exchange material 36 consists of zeolite, synthetic resin particles or any one of a number of commercially available materials for removing the objectionable deposits in hard water, such as calcium, magnesium, iron or the like. Although this disclosure is specifically directed to a process and apparatus for softening water, it will be evident that the teachings may be applied equally as well to the removal of deposits in liquids generally. Since some of these ion-exchange materials expand slightly during the reaction involved in removing and replacing ions, and further since it is desirable to fluff the ion-exchange material 36 prior to regeneration, as hereinafter described, filling of the tanks approximately half full leaves sufficient space to permit such expansion and fluffing without losing the material in the drain lines. The bottom of the tanks are provided with a bed of gravel 37 which serves to filter the soft water on its path to faucet 17. Disposed within the gravel is a second distributor 38 furnished with spaced openings 39 and shaped to the same general configuration as distributor 32 located in the top of the tanks. The second or lower distributors 38 collect the water after being softened by passage through the bed 36 and deliver it through pipes 40 and 42, valves 44 and 46 to the soft water outlet connected to the domestic tap 17 or other point of use.

FIGURE 1 illustrates the position of valves and path of water flow when the system is supplying soft water and, in operation, hard water is admitted to the ion-exchange tanks 10 and 12 through a parallel arrangement of parts consisting of valves 18 and 20, pipes 28 and 30 prior to being sprayed through distributor slots 34 into the tanks. As the hard water filters through the ion-exchange material, it is softened and then delivered through the conduits 40 and 42 and valves 44 and 46 to the soft water outlet. The water is confined to the above described path of travel and will not enter the brine tank 100 because valve 142, hereinafter described, is in a closed position. Valves 49 located in the hard water inlet pipes 28 and 30 may be operated selectively to isolate either one of the tanks.

Referring now to the valves employed in the system, it will be noted that the identical valve housings 18 and 20 are provided with a partition 50 having an opening adapted to be sealed by valve 52 when moved to the up position. A valve stem 54 extends into chamber 24 and is equipped with a disc 56 having a diameter considerably less than the internal diameter of the chamber, to permit unimpeded flow of water therearound prior to delivery through discharge line 58 connected to the drain pipe 60. As shown, solenoids 62, connected to appropriate controls, such as a timer, normally maintain valves 64 and 65 in the closed position. As hard water is supplied through the valve housings 18 and 20, the chambers 24 and 26 are maintained at the same pressure as the inlet thus permitting valves 52 to remain in the open position and supply hard water to the top of the tanks. When either of valves 64 or 65 is actuated to the open position, say valve 64, the pressure drops in chamber 24 and the velocity of water flowing through the housing as a consequence, moves the disc upwardly until valve 52 seats and thereby shuts off water flow into tank 10.

The double acting valves 44 and 46 shown in FIGURES 1, 2 and 3, are free floating and consist of a housing having a partition equipped with a valve seat 66 arranged for engagement by 68. The valve stem 70 is hollow and terminates at its other end in a yoke 72 subtending a cylindrical member 74 furnished with a central passageway 76. O-ring 77 is mounted in the peripheral surface of member 74 for providing a close fit with walls 78 of the housing in which it slides. The housing is equipped with openings for receiving pipe 40, soft water outlet 16 and pipe 80 extending to the brine tank 100. The valve 68 is designed to be lifted from its seat when soft water is flowing upwardly through the valve housing for delivery to outlet 16. When water flows in the reverse direction however, the free-floating valve seats, and cylindrical member 74 assumes the position shown in FIGURE 3. The passageway in the hollow stem then provides an avenue for the water and since the valve stem terminates short of passageway 76, water crossing the gap between the valve stem end and member 74, creates a suction on liquid in the housing and discharges a mixture of the two into pipe 40.

The valve 82 illustrated in FIGURE 4 also is of a free floating double acting tube consisting of a housing having three openings 84, 86 and 88 for receiving pipes connected thereto as shown in FIGURE 1. A pair of partitions 90 and 92 provide valve seats for accepting valves 94 and 96.

The only remaining component in the system consists of the brine tank 100 and its associated valving arrangements used in supplying a brine solution to the ion-exchange tanks during the regenerating cycle. As illustrated in FIGURES 1, 2 and 5, the brine tank comprises a casing 120 having a cylindrical standpipe 122 positioned adjacent the inner wall thereof. The standpipe contains a single pipe 80 for supplying water in one direction to the brine tank for forming the needed brine solution, and for delivering this solution to the system in the opposite direction during the regenerating cycle. A valve 48 is included in pipe 80 as an emergency measure to limit the height of water in tank 100. Pipe 80 terminates in a fitting 124 near the bottom of the brine tank and makes connection with a fresh water inlet tube 126 and brine outlet tube 128, both of semi-circular shape and located within and at the bottom of the brine tank, as more clearly shown in FIGURE 5. These inlet and outlet tubes are equipped with rubber flapper valves 130 and 132; valve 130 being mounted to permit fresh water flow from pipe 80 into tube 126 via 124 and 122, while valve 132 allows brine flow only out of tube 128 into pipe 80. The tubes further are serrated at 129 on their upper surfaces to permit water flow into one side of the tank 100 and discharge brine from the other. The ends of the tubes are crimped to a 90° angle and the exposed end placed on the tank bottom to provide the necessary tube support. In order to obtain a concentrated brine solution, commercially available salt fills approximately one-quarter of the tank as indicated at 136 and a brine level 138 is normally maintained at the one-half level. Also, fine gravel 140 covers the brine outlet pipe to act as a filter and prevent foreign deposits from entering the water softening apparatus.

The serrated tubes are disposed in opposite sides of the brine tank or container 100 in order to assure maintenance of the salt at a desired level and for obtaining the desired operation in the tank. In normal use, dirt and other foreign deposits, particularly that located in the salt particles, tends to pack together with the salt grains to form an encrusted bridge which is detrimental to operation of the tank. Only filtered soft water is supplied to the brine tank and the disposition of the serrated tubes prevents encrustation of the salt since it is caused to remain loose and fall over the tubes as water is successively supplied to and removed from the brine tank. This arrangement has the further advantage inasmuch as highly purified salt need not be used in the system. It also restricts the dirt and other particles to the brine tank thus minimizing delivery of dirt to the ion-exchange tanks.

The fitting 124 is designed to control the level of brine in the tank by shutting off flow of water thereinto when it reaches a predetermined level. Control of water flow is accomplished by an arrangement of devices comprising a floating ball 142 positioned within the fitting and adapted normally to cover aperture 144, and alternately 156, through which water flows during brine tank filling operation. Also mounted within the casing is a float 146 having an arm 148 extending downwardly into the fitting and being equipped with a mushroom-shaped rubber valve 150 arranged to close opening 152. It will be evident that as water flows to the brine tank from pipe 80 and through fitting 124, the ball 142 will rise off its seal, and since float 146 will be in the lower-most position, the water is permitted to flow through opening 152 into standpipe 122 and tube 126 into one side of the brine tank. The velocity of water will tend to move the ball upwardly but projection 154 prevents it from covering opening 156. The length of arm 148 is chosen such that when the brine solution reaches height 138, the mushroom valve 150 will not close opening 152 but projection 154 will rise a sufficient distance to permit ball 142 to close opening 156, thus shutting off water flow to the tank. In the event floating ball 142 does not close opening 156 however, water will continue to cause float 146 to rise until the level in the brine tank rises an amount sufficient to cause valve 150 to seat in the opening 152 and shut off flow to the tank.

When demand is placed on the tank for delivery for a brine solution to the system, the ball moves off its seat 156 and permits the solution to flow through pipe 80. Flow will continue until ball 142 seats in opening 144. The mushroom valve 150 is designed to permit flow through opening 156 at all times.

A particular advantage derived from use of the above described float-ball valving arrangement is that since float 146 normally will not permit valve 150 to close, because ball 142 controls the filling and exhausting operation, it is in a floating condition when the container is filled to the usual level. An operator or owner of the above-described equipment may readily ascertain whether the valving arrangements are properly working by merely grasping the float and if it appears loose in the tank, it means that the ball is serving its intended function. However, if the float appears bound in the tank, this means that the ball is not operating properly and the float is causing its connected valve to seal. Remedial measures are then desirable to correct the defective operation.

In order to protect against the situation where neither the ball 142 nor mushroom valve 150 serve their intended function, valve 48 becomes operative to prevent the brine tank from overflowing into the basement or other area where it is located. Valve 48, FIGURE 2, comprises a shaft 158 having a valve face 160 adapted to close the opening in pipe 80 as shown. The valve is normally held in the open position against the action of a compressed spring 162. A lever 164, pivoted at 166, is furnished with a central opening encompassing the shaft end and therefore is free to move with respect thereto. The other end of lever 164 pivotally carries a float 168 having an arm terminating in a portion 170 which engages a side of the valve housing. With the parts arranged as shown in FIGURE 1, the float 168 is located at a predetermined low position and with its terminal portion 170 in firm engagement with the valve housing. This arrangement causes the lever 164 to move shaft 158 outwardly, thereby compressing spring 162 and simultaneously holding the valve face 160 off its seat. The parts are normally in this position thus permitting free flow of water or brine through pipe 80. In the event the ball and mushroom valves 142 and 150 fail to operate during the step of filling the brine tank with water, the latter will continue to rise in the tank until float 168 moves upwardly to effect disengagement of portion 170 with the housing and permit spring 162 to close valve 48 and stop flow of water to the tank. Although different types of valving arrangements have been disclosed to control flow of water into the tank, it is to be understood that either one or all may be employed. Also, other valves of well known design may be used for carrying out the above-described function.

*Operation*

FIGURE 2 illustrates the condition of the system when performing the regenerating cycle. When the ion-exchange material becomes exhausted to the point where regeneration is desired, the timer or other control actuates one of the solenoids, 62, and moves valve 64 to an open position. With the system now open to the drain line, the pressure in hard water inlet pipe 14, which is connected to city mains, causes water to flow through chamber 24 and past open valve 64 into the drain. The velocity of water acting under disc 56 moves valve 52 to the closed position shown in FIGURE 2, thus preventing flow of hard water through pipe 28 to ion-exchange tank 10. Since solenoid valve 65 remains closed, hard water is still free to flow into tank 12 when either the soft water faucet 17 or valve 64 is in the open position. An unobstructed water passageway through the tanks is established by the following circuit: Inlet pipe 14, valve housing 20, tank 12, pipe 42, valves 46 and 44, pipe 40, tank 10, pipe 28, valve housing 18, pipe 58 to drain 60.

As soft water flows from tank 12 through pipe 42 to valve housing 46, the valve 68 is moved off its seat permitting the water to continue to housing 44. The velocity of water acting on the upper surface of valve 68 forces it to the closed position and cylindrical member 74 moves into engagement with the walls of housing 44 as shown. Since valve stem 70 is hollow, the water flows therethrough and discharges through passageway 76 into pipe 40.

Simultaneous with the closing of valve 68, the pressure in pipe 104 causes valve 96 to seat thus requiring water to flow only through the hollow valve stem 70, or through soft water outlet 16 when faucet 17 is opened. The water thus flowing from the stem into pipe 40 creates a suction in chamber 71 by venturi action in a well known manner. The decrease in pressure in chamber 71 permits atmospheric pressure to force brine from tank 100 through pipe 80, open valve 94 and pipe 106 into chamber 71 where it is caused to mix thoroughly with the water flow from the hollow stem into pipe 40. This mixture is then discharged through orifices 39 and filters through the ion-exchange material on its path to the top of tank 10 and in so doing, regenerates the ion-exchange material to its original condition.

Discharge from tank 10 is made through distributor 32 to pipe 28, valve housing 18 and pipe 58 and finally into drain line 60. Flow of the soft water-brine solution into the tank continues until the brine in tank 100 is depleted. The amount of brine necessary for obtaining complete regeneration of the ion-exchange material is determined according to the volume of such material present in the tank. The opening in valve stem 70 is selected to pass approximately 2 gallons of brine through a 7½ gallon ion-exchange tank in approximately 20 minutes. The size of the tank 10, amount of brine and the length of time it contacts the ion-exchange material can be varied to satisfy particular installations but the about ratios generally should be adhered to.

When the brine in tank 100 is almost depleted, ball 142 closes opening 144 and soft water from tank 12 continues to flow through the ion-exchange material in tank 10 until all traces of brine have been removed. This flushing and rinsing action normally is carried out for fifteen minutes at the rate of one gallon per minute. Another particular advantage derived from flushing with filtered soft water is that the likelihood of leaving a deposit of foreign particles in the lower portions of tank 10, along with consequent exhaustion of the ion-exchange material in that area, is minimized considerably. The time required for flushing or rinsing can be set into the timer controls in a well known manner, and when the predetermined time elapses, solenoid 62 is deenergized to close valve 64. Since the pressure on both sides of partition 50 in valve housing 18 becomes equalized, the valve 52 is permitted to drop to the open position and thus permit hard water flow into tank 10 for softening.

The pressure in pipes 106 and 80 is at a reduced pressure at this instant and when valves 64 and 52 are respectively moved to the closed and open positions, water pressure is reflected to the lower pressure areas in these pipes. Its velocity upwardly through pipe 40 moves member 74 to the up position shown in FIGURE 1, thus permitting water to flow through pipes 106 and 80 to the brine tank 100. When the brine tank is filled to the desired height, ball 142 seats in opening 156 and readies the tank for the next regeneration cycle. It will be noted that even though member 74 is not moved upwardly, the water would still flow through passage 76 to pipe 80 and the brine tank.

It will be evident that regeneration of the material in tank 12 will be accomplished in the same manner except valve 65 will be opened to initiate action whereby the water flow will be reversed from that previously described for tank 10.

In some instances, it may be desirable to fluff the bed of ion-exchange material prior to the introduction of the soft water-brine solution. This may be accomplished by a number of different constructions, but in the preferred form, a solenoid 200 is connected with the timer for joint operation with either of solenoids 62. Solenoid actuated valve 202 is permitted to remain open for only a few seconds because the intake of air creates a highly disturbing action on the ion-exchange material.

The modification shown in FIGURES 8, 9, 10 and 11 operates in the same manner as the system described above in connection with FIGURES 1 and 2. The difference in construction however resides in a more simplified arrangement of the valve housings 18 and 44. The other similar parts are identified by the same reference characters. As shown, the equivalent of valve housing 18 and 20 consists of a single housing 206 containing valve and valve seats to control flow of hard water therethrough to the ion-exchange tanks as indicated by the arrows in FIGURE 8. After passing through the tanks 10 and 12, the now softened water flows to valve housing 44 prior to making its exit from soft water outlet 16.

Referring more specifically to the parts, it will be seen that valve housing 18 is provided with a double acting valve 208 equipped with a single stem 210 having flow restriction plates or discs 212 attached to opposite ends thereof. Springs 214 are biased between the discs and caps or plugs 216 screw threaded into opposite ends of the housing as clearly shown in FIGURE 10. The tension in the springs is chosen to be of equal value in order to permit the valve 208 to assume the balanced position illustrated in FIGURE 8. The valve is chamfered or beveled on opposite sides 218 and at an angle to mate with corresponding valve seats 220 and 222 formed on yokes 224 secured in a fixed position in the housing. When the valve is off either seat 220 or 222, water is permitted to flow through the yoke and openings 226 therein shown in FIGURE 11. The yoke may be fixed in the housing by any one of several arrangements but in the preferred form, snap rings 228 fit into appropriate grooves formed in the housing and on opposite sides of the yokes. O-rings 230 prevent escape of water along the inner wall of the housing.

As in the previous modification, when the timer opens either of drain valves 64 or 65, water flow against the exposed surface of disc 212 forces valve 208 on to the appropriate valve seat thereby to cause water to flow past the other open valve and into an ion-exchange tank to start the regenerating process. The arrows in FIGURE 8 show operation in providing soft water to both ion-exchange tanks, but in light of the foregoing matter describing operation during regeneration, it will be evident that flow through one of the tanks will be reversed.

Referring now to the housing 44 in FIGURES 8 and 9, it will be noted that the valves are positioned in the single housing but operation is the same as that described in connection with FIGURES 1 and 2. In this embodiment, valves 68 are equipped with hollow stems 70 supported in bearings 240 held in the housing body by snap rings 242. The stems terminate short of the yoke supported cylindrical member 74 adapted to slide into and out of an element 244 also fixed in the housing by snap rings 246. The other end of the stems supporting valves 68 are equipped with springs 248 normally biasing the valves off their seats to the open position shown in FIGURE 8.

With valve 208 in the closed position to obtain regeneration of tank 10, hard water flows into tank 12, is softened and delivered through pipe 42 to housing 44. Upon entering the housing, it divides to flow in pipe 104 and move valve 92 on to its seat thus shutting off flow therethrough. All of the water then flows through element 244 and past the open valve to exert force on valve 68 in the left side of the housing and move it to the closed position. The water then travels through the hollow stem 70 and creates a suction in chamber 75 as it crosses the gap to member 74. The suction draws brine through pipe 106 which mixes with the soft water prior to delivery to tank 10 to effect regeneration of the ion-exchange material therein. After leaving tank 10, the mixture flows through pipe 28, past disc 212 and into the drain line. When valve 64 eventually is actuated to the closed position in the manner described in the previous embodiment, spring 248 moves valve 68 to the open position and soft water is permitted to flow through pipe 106 to refill the brine tank.

The modification shown in FIGURES 6 and 7 illustrate application of the teachings of the invention to a commercial installation employing a plurality of ion-exchange tanks 10 and 12 utilized in providing soft water to a point of use. The general organization consists of a raw or hard water inlet pipe 14 extending to each of the three parallel connected ion-exchange tanks. A soft water pipe 16 receives soft water from each of the tanks for delivery to user equipment (not shown). A drain line 60 is connected to the tanks as well as pipes 80 joining the tanks 10 and 12 with a single brine tank 100 serving any one or more tanks when regeneration of the ion exchange material is necessary. Timers 180 associated with solenoids 62 for controlling valves in the drain lines are included in the system as well as valves 18 and 44 described in connection with the previous modification. The operation of the system is based on the same principles as that previously disclosed except that the structure has been modified to the extent of mounting valves 18 and 44 directly on the upper portion of each tank.

As illustrated in FIGURE 7, the cap 182 of each tank preferably is removable and is of hemispherical shape having valves 18 and 44 connected to pipes 184 and 186 integrally attached to the cap. Pipe 186 is of sufficient length to extend to the bottom of the ion-exchange tank and has its open end covered with a filter for preventing entry of foreign particles into the system. In the alternative, the pipe can be terminated in a circular tube provided with serrations as illustrated in FIGURES 1, 2 and 5. The function served by pipe 186 is to accept water, after it has filtered through the ion-exchange material, for delivery to the soft water outlet. Also, it serves as an inlet for the brine solution used in rejuvenating the material. The open end of pipe 184 terminates adjacent the top of cap 182 and serves to provide the ion-exchange tanks with hard water for softening and as an outlet to the drain during regenerating process.

The advantages derived from mounting valves 18 and 44 on the cap 182 are believed evident. The construction facilitates assembly of the various parts when initially installing the system since the valves and associated piping can be assembled at the factory prior to shipment. The maze of pipes normally used in water softening systems is reduced to a minimum thus effecting economy in both labor costs and material. After the system has been operative for a time sufficient to cause wearing of valve faces and valve seats or when replacement of the ion-exchange material is desirable or when other maintenance work must be done, the cap and associated valves can be removed easily as a unit and replaced by a similar unit thus minimizing inconvenience to the user.

In operation, all of the ion-exchange tanks 10 and 12, or any combination thereof, may provide soft water to the area of use through pipe 16. This constitutes normal operation of the system and hard water flows from pipe 14 through open valve 18 into the tanks containing the ion-exchange material. Valves 64, 65 and 142 (not shown) are closed at this time and the only outlet for water from the tanks 10 and 12 is through valves 44 which are open to the soft water pipe 16. The pressure from the hard water source therefor prevails throughout the system so that when valve 17 is opened, the pressure causes water to flow from the tanks through pipes 186, valve 44 and pipe 16 to the point of use. As water is drawn from the tanks it is of course simultaneously replaced by an equal amount from the source.

When one of the timers 180 energizes a solenoid 62 for opening its attached valve and thereby initiating regenerating action, say of tank 10, the forces caused by flow of water in the system as previously described, causes valves 18 and 44 to assume the position shown in FIGURES 2 and 3. Since the supply of hard water is cut off to tank 10 and a free passageway is opened to the drain line by virtue of the reversed position of valve 18 and opening of the solenoid valve, soft water from the tanks 12 flow through line 16 and into valve 44 on tank 10. As previously described, soft water flow through hollow stem 70 creates a suction on the brine tank 100 through pipe 80 and valve 82. The brine solution discharges into the bottom of tank 10 and during its course of travel upwardly, passes in contact with the ion-exchange material to effect regeneration prior to passing to the drain line through valve 18 and pipe 60. When brine flow stops, soft water rinses the material for a predetermined period, as determined by the timer, until the valve connected to solenoid 62 closes. This action causes reversal of valves 18 and 44 and soft water fills the brine tank 100 for forming a fresh solution of brine. Rejuvenation of material in tanks 12 is carried out by the same process when called for by timers 180.

In view of the above it will be evident that many modifications and variations are possible in light of the above teachings. The principal inventive aspects of the invention are directed to the use of soft water at all times in the system, particularly when regenerating the ion-exchange material 36 in tanks 10 and 12. It therefore is to be understood that within the scope of the appended claims the invention may be practiced otherwise than as specifically described.

What I claim as new and desire to secure by Letters Patent of the United States is:

1. A process for rejuvenating ion-exchange material in parallel connected tanks in a water softening system comprising the steps of connecting the first of said tanks to be rejuvenated with a drain pipe, providing a supply of hard water to the second tank and passing it in ion-exchange relationship with material therein for producing soft water at the outlet thereof, mixing the soft water with brine prior to entry into said first tank to obtain a soft water-brine solution, passing said solution through a contaminated bed of ion-exchange material in said first tank for a period of time sufficient to effect rejuvenation thereof and discharging said solution after contact with said material from said first tank into the drain pipe, then flowing the soft water from the second tank without brine, through the first tank for a period of time after the rejuvenation of said material is complete to rinse out all traces of brine ocmmingled with the material, and disconnecting said first tank from the drain pipe.

2. The process according to claim 1 wherein soft water from the second tank is supplied also to a point of domestic use.

3. A process for rejuvenating ion-exchange material in either one of a plurality of parallel connected tanks connected in a water softening system comprising the steps of connecting the first of said tanks to be rejuvenated with a drain pipe, providing a supply of hard water to the second tank and passing it in ion-exchange relationship with material therein for producing soft water available for domestic use at the outlet thereof, conducting the soft water to a mixing device, mixing said soft water with a predetermined amount of brine at a predetermined rate to obtain a soft water-brine solution, passing said solution reversely through a contaminated bed of ion-exchange material in said first tank for a period of time sufficient to effect rejuvenation thereof, concurrently discharging said solution after contact with said material from the first tank into the drain pipe, continuing flow of the soft water through the first tank after rejuvenation of the material is accomplished for a period of time sufficient to rinse out particles of brine remaining therein, and then disconnecting the first tank from the drain pipe to permit flow of hard water therethrough for providing soft water to a point of use.

4. A process for rejuvenating ion-exchange material in either one of a pair of parallel connected tanks connected in a soft water supply system comprising the steps of permitting hard water to flow over ion-exchange material in a first tank to produce soft water at the outlet thereof, passing the soft water through a mixing device and causing it to draw brine from a brine container and mix therewith in predetermined quantities to form a soft water-brine solution, passing said solution over ion-exchange material in a second tank prior to discharge to a drain and for a period of time sufficient to obtain rejuvenation of said material in the second tank, continuing flow of soft water through the second tank after exhaustion of the said soft water brine solution, and when rejuvenation is complete, to remove remaining traces of brine therein, stopping flow of soft water through the second tank and simultaneously causing soft water to fill the brine container to a level which represents an amount of brine sufficient to obtain rejuvenation of the ion-exchange material, and isolating the brine container from the soft water system.

5. The process of rejuvenating ion-exchange material in tanks connected in a water softening system wherein hard water is supplied to the top of the tanks and passed over ion-exchange material therein for demineralizing the water and providing a supply of soft water from the bottom thereof, comprising the steps of shutting off the supply of hard water to the top of the first of said tanks and connecting the top of said first tank to a drain line, supplying hard water to the top of the second tank and causing it to pass in contact with ion-exchange material therein for providing soft water at its outlet, conducting the soft water to a mixing device, causing the flow of water therethrough to create a suction on a predetermined amount of brine in a container, mixing the soft water and brine to form a soft water-brine solution, passing said solution into the bottom of said first tank and permitting it to filter therethrough prior to being discharged from the top thereof into said drain line, continuing flow of soft water through said first tank after said predetermined amount of brine is exhausted to completely rinse the tank of particles of brine, replenishing the supply of brine, and isolating the brine container from the system, closing the connection between the drain line and top of the first tank and reconnecting the supply of hard water to the top thereof, and reversing the process to obtain rejuvenation of the ion-exchange material in the second tank.

6. In combination, apparatus for rejuvenating ion-exchange material in a water softening installation comprising a pair of parallel connected tanks having ion-exchange material therein, supply pipes connecting the top of said tanks with a source of hard water and discharge pipes attached to the bottom of said tanks for conducting water softened during its passage through the tanks to a point of use, means in said supply pipes selectively operable to connect the top of said tanks with said source of hard water or a drain line so that hard water may be supplied to the top of the tanks or liquid in the tanks may be drained into said drain line, liquid mixing means in said discharge pipes capable of permitting unimpeded flow of soft water from the tanks therethrough to the point of use, said mixing means comprising a housing having an element therein selectively movable to a first position to permit said unimpeded flow or movable to a second position to allow flow of soft water from a first tank toward the second of said tanks and in a direction opposite to soft water flow, a source of brine connected with said housing of the mixing means so that when soft water from the first tank moves said element to the second position, brine from said source is caused to mix with soft water from the first tank and be circulated reversely through the second tank to rejuvenate the ion-exchange material therein prior to discharge to said drain line, and a valve connected between the drain line and the means in said supply pipes for shutting off flow in the reverse direction through the second tank.

7. In combination, apparatus for rejuvenating ion-exchange material in a water conditioning system comprising a pair of tanks having ion-exchange material therein, a source of hard water supply connected with inlets to said tanks, separately controlled valve means connected between said inlets and said source of supply for selectively controlling water flow thereto, separate water flow control devices respectively interconnecting the outlets of said tanks with a point of use so that when demand is placed on the system at the point of use and the valve means are activated to permit water flow into the tanks, the hard water is softened during its passage therethrough prior to delivery to the use point, a cross connection between said separate water flow control devices to permit soft water flow from one of the tanks through the cross connection and into the other tank for rejuvenation of the material therein when the valve means for said other tank is activated to cause flow of water in a reverse direction through the other tank, a pipe connecting said control devices with a source of brine used in regenerating the ion-exchange material in the tanks, means in each of said control devices effective in establishing an area of reduced pressure therein when water flows in a reverse direction through one of the devices thus causing brine to enter the device and mix with water flowing reversely therethrough to the tank, and means connected with said tanks for fluffing the material therein prior to circulating water therethrough in the reverse direction.

8. In combination, apparatus for rejuvenating ion-exchange material in a water softening installation comprising a pair of parallel connected tanks having ion-exchange material therein, supply pipes connecting the top of said tanks with a source of hard water and discharge pipes attached to the bottom of said tanks for conducting water softened during its passage through the tanks to a point of use, means in said supply pipes selectively operable to connect the top of said tanks with said source of hard water or a drain line so that hard water may be supplied to the top of the tanks or liquid in the tanks may be drained into said drain line, liquid mixing means connected in the discharge pipes between the tanks and the point of use, said liquid mixing means being constructed to permit soft water flow therethrough to the point of use or in an opposite direction from one tank to the other, a source of brine connected with a portion of the liquid mixing means which is under a vacuum when soft water flows from one tank to the other, so that when the means in the supply pipes connected to one of the tanks is actuated to connect that tank to the drain, soft water from the other tank flows through the liquid mixing means and in doing so creates a vacuum therein and draws brine from the source which commingles with the soft water prior to flowing reversely through said one of the tanks for rejuvenating the ion-exchange material therein.

9. In combination, apparatus for rejuvenating ion-exchange material in a water softening installation comprising a pair of parallel connected tanks having ion-exchange material therein, supply pipes connecting the top of said tanks with a source of hard water and discharge pipes attached to the bottom of said tanks for conducting water softened during its passage through the tanks to a point of use, means in said supply pipes selectively operable to connect the top of said tanks with said source of hard water or a drain line so that hard water may be supplied to the top of the tanks or liquid in the tanks may be drained into said drain line, liquid mixing means connected in the discharge pipes between the tanks and the point of use, said liquid discharge means comprising a housing having a movable element constructed to permit unimpeded flow of soft water therethrough to the point of use or restricted flow from one tank to the other when the water flows through the housing in a reverse direction, a chamber in said housing which is placed under a vacuum when water flows in the reverse direction, a source of brine connected with the chamber, so that during regeneration when the means in one of the supply pipes is operated to connect the first tank to the drain, a predetermined amount of soft water from the other tank flows through the liquid mixing means and in doing so draws brine into the reduced pressure area in said chamber to form a soft water-brine solution which flows in a reverse direction through said first tank to rejuvenate the material therein, a device connected with said means in the supply pipes for shutting off flow from the first tank to the drain when the process is complete, and valve means in a container holding said source of brine operable for controlling the liquid level therein when it is refilled with water.

10. The combination according to claim 9 wherein a cross connection including a valve connects the bottom of said tanks so that when the valve is opened, soft water from one tank can flow to the other for fluffing the bed of ion-exchange material and for dispersing in the water any foreign matter in the tank.

11. In combination, apparatus for rejuvenating ion-exchange material in a water softening installation comprising a pair of parallel connected tanks having ion-exchange material therein, supply pipes connecting the top of said tanks with a source of hard water and discharge pipes attached to the bottom of said tanks for conducting water softened during its passage through the tanks to a point of use, means in said supply pipes selectively operable to connect the top of said tanks with said source of hard water or a drain line so that hard water may be supplied to the top of the tanks or liquid in the tanks may be drained into said drain line, a pair of liquid mixing means in said discharge pipes respectively connected between the tanks and a point of water use and capable of permitting unimpeded water flow therethrough in one direction to the point of use, but restricted flow in the opposite direction when soft water flows directly from one tank to the other, each of said liquid mixing means comprising a housing having a valve therein movable off its seat when water flows to the point of use, said valve having a hollow stem terminating in a pressure reducing device, a source of brine connected with the housing of each of said liquid mixing means, so that when said means in one of said supply pipes is actuated to connect the first tank to the drain, soft water from the second tank flows reversely through the first tank by way of said liquid mixing means, and in doing so, causes said valve to seat and permit the soft water to flow through the hollow stem and across the pressure reducing device where it creates an area of reduced pressure in the housing effective in drawing brine therein where it mixes with the water prior to flowing in a direction opposite to hard water flow in the first tank where it rejuvenates the material and finally flows into the drain.

12. The combination according to claim 11 wherein the brine is held in a container, valve means on said container operative to shut off water flow therein after a predetermined amount of water is delivered to the container for making the brine.

13. The combination according to claim 12 wherein said brine container comprises a housing having a valve controlled common supply and return pipe, and liquid distributing means inside said container for permitting flow into one side thereof and discharge from the other side.

14. A control device for use in a water conditioning system comprising a U-shaped housing having a single inlet and a plurality of outlets, means in said housing forming a pair of partitions equipped with valve seats, a valve including a stem movably mounted in each of said partitions and positioned between said partition and the inlet, a restrictive device attached to the other end of each of said stems and of a size sufficient to provide a loose fit in the housing, and said outlets in said housing being positioned on the other side of the restrictive devices, so that when one of the outlets associated with each of said valves is closed, water is permitted to flow from the inlet past said valves and out the other outlets positioned between the restrictive devices and said partitions, and when said other outlets are closed, water is adapted to flow therethrough in a reverse direction and against one side of said restrictive devices to move each of said valves on to their seats and shut off flow through the housing.

15. A valve for use in a water conditioning system comprising a housing having a hard water inlet and a plurality of outlets positioned on opposite sides of the inlet, partitions providing valve seats in said housing, valve means having stems connected thereto arranged for contact with the valve seats, a restrictive device attached to the other ends of the stems, said plurality of outlets comprising first water discharge means in a wall of the housing between the partitions and the restrictive devices, second water discharge means in a wall of the housing on the other side of said restrictive devices so that with the second discharge means closed, water is permitted to flow through the inlet and past the valve seats and first discharge means to a point of use, and when at least one of said second water discharge means is closed, water flowing past said valve seat, acts on the corresponding restrictive device to close its connected valve and thereby permit water to flow in a reverse direction from one of said first discharge means past corresponding restrictive device and out one of said second discharge means.

16. A valve for use in a water conditioning system comprising a housing having means therein forming a valve seat, a hollow stem having a valve on one end positioned for movement with respect to said valve seat, an inlet and outlet in said housing on opposite sides of said valve seat, valve means on the other end of said stem arranged to be positioned in the inlet when said valve is seated, said valve means permitting flow of liquid through said housing when said valve is off its seat and when the valve is seated liquid is adapted to flow in a reverse direction through the outlet into the housing and through said valve stem and valve means to the inlet, a third opening in said housing between said valve seat and the inlet, so that when liquid is flowing in said reverse direction through the housing, discharge thereof through the valve means creates an area of reduced pressure in the housing for drawing fluid through said third opening for mixing with said liquid during discharge from the housing.

17. The combination according to claim 16 wherein said valve means comprises a member having an axial passageway and surmounting a yoke, means securing said stem to the yoke and spacing it from the passageway so that when liquid crosses the gap between the stem and passageway, the reduced pressure is created to draw fluid through said third opening.

18. A valve for use in a water conditioning system comprising a housing having inlets on opposite ends thereof, a common outlet for said inlets positioned centrally in the housing, a pair of partitions forming valve seats in the housing, third openings in the housing wall between said inlets and the partitions, slidably mounted valve means in each of said partitions, each of said valve means comprising a hollow stem having a valve on one end thereof selectively operable to engage the valve seats and control liquid flow through the housing, a device on the other end of the stem for permitting flow of liquid through the housing when the valve is off its seat, and when one of said valves is seated, liquid is permitted to flow past the other valve into the housing where it flows through the outlet and through the hollow stem of the closed valve for discharge in a reverse direction through the corresponding inlet, said device being operative to create an area of reduced pressure in the housing resulting from venturi action established when the liquid flows from the hollow stem into the device and inlet, said reduced pressure being effective to draw fluid through the third opening for mixing with the liquid during discharge from the housing.

19. A valve for use in a water conditioning system comprising a housing having inlets on opposite ends thereof, a common outlet for said inlets positioned centrally in the housing, a pair of partitions forming valve seats in the housing, third openings in the housing wall between said inlets and the partitions, slidable mounted valve means in each of said partitions, each of said valve means comprising a hollow stem having a valve on one end thereof selectively engageable with its respective valve seat so that when the valve is in an open position, water is permitted to flow from the inlets freely past the respective partitions to the outlet, but when one of the valves is seated, water is permitted to flow past the other valve and into the hollow stem thus providing restricted flow in a reverse direction toward the inlet corresponding to the seated valve, a pressure reducing device connected to the other end of the hollow stem and engageable with the inlet when the valve is seated, so that when water flows through the stem and across the device, it creates an area of reduced pressure in the housing capable of liquid thereinto through the third opening for mixing with the water prior to discharge from the housing.

References Cited in the file of this patent

UNITED STATES PATENTS

| | | |
|---|---|---|
| 2,192,451 | Moore | Mar. 5, 1940 |
| 2,217,692 | McGill | Oct. 15, 1940 |
| 2,245,767 | Eichmeyer et al. | June 17, 1941 |
| 2,641,280 | Fleischhauer | June 9, 1953 |
| 2,665,709 | Harvey | Jan. 12, 1954 |
| 2,695,626 | Riche | Nov. 30, 1954 |
| 2,716,422 | Whitlock | Aug. 30, 1955 |
| 2,723,955 | Sebald | Nov. 15, 1955 |
| 2,751,347 | Miller | June 19, 1956 |